April 6, 1937.  R. STRINDBERG  2,076,304

GAS FILTER

Filed Dec. 10, 1934

Inventor
Richard Strindberg
By Geo. H. Kennedy Jr.
Attorney

Patented Apr. 6, 1937

2,076,304

UNITED STATES PATENT OFFICE 2,076,304

GAS FILTER

Richard Strindberg, Worcester, Mass., assignor to Development Associates, Inc., Worcester, Mass., a corporation of Massachusetts Application December 10, 1934, Serial No. 756,810

7 Claims. (Cl. 183—71)

The present invention relates to air or gas filters of the "dry" type, and particularly to filters for the removal of impurities in the air entering the cylinders of compressors or internal combustion engines.

A large part of the wear on the parts of air compressors in internal combustion engines results from the entry of dust and other small abrasive particles with the air drawn into the cylinders thereof. This dust and abrasive particles have been removed from the air by filter units through which the air passes before entering the compressor or engine, but the usual type of dry filter requires frequent cleaning as the result of the accumulation of foreign matter in the filtering medium. One of the objects of the present invention is to avoid the necessity for such cleaning by the provision of a filter which is self-cleaning, thereby eliminating almost entirely any manual cleaning of the filter.

For best results, the filter units must provide for the admission of a large amount of air to the compressor or engine without offering any substantial resistance to the flow of air through the unit, at the same time removing all of the particles of foreign matter in the air. A further object of the present invention is accordingly to provide a filter which embodies these characteristics, and which is at the same time simple in construction.

Other and further objects and advantages of the invention will more fully appear from the following detailed description taken in connection with the accompanying drawing, in which—

Like reference characters refer to like parts in the different figures.

Figure 1:
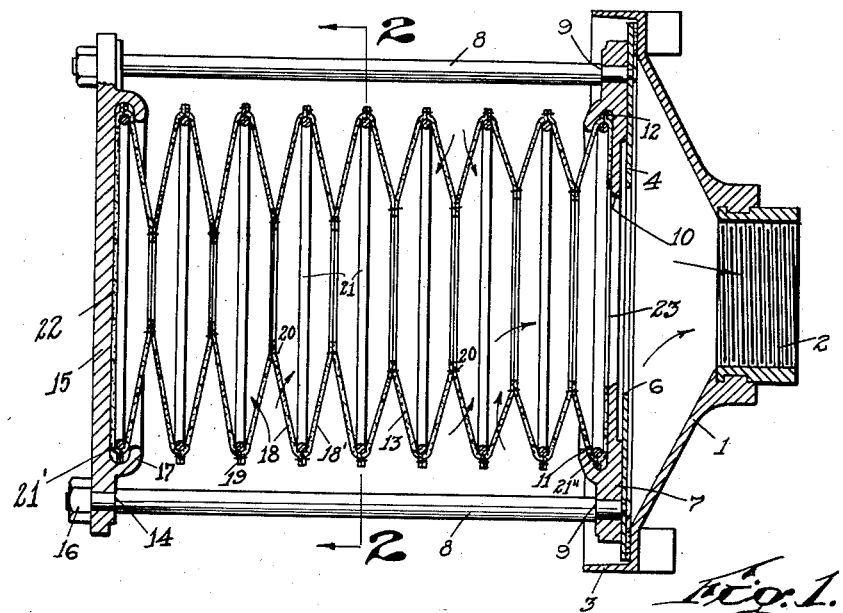
Fig. 1 is a sectional view through a filter unit embodying the invention.

Referring first to Fig. 1, the filter unit is attached to a base 1, preferably rectangular and having a centrally located opening 2 by which said base may be connected to the intake of an engine or compressor. Said base has a flange 3 thereon, to which may be connected a suitable cover, not shown, of well known construction for protecting the filter unit. An adapter 4, which is secured to the base by screws 5 and has a central opening 6 in alinement with the opening in the base, provides a mounting for the filter unit on said base, said adapter being shaped to correspond to the base on which the unit is to be mounted, the base shown being merely one example of a support for the filter unit.

The filter unit of the invention comprises a plate 7 which is secured to the adapter 4 by riveting the ends of bolts 8 which extend through said plate and adapter. Each of said bolts has a shoulder 9 against which said plate and adapter are held by the riveted ends of said bolts. Said plate has a central opening 10 therethrough in alinement with the opening in the adapter, and an annular flange 11 extends inwardly on the side of said plate opposite to the adapter to form an annular groove 12 for the reception of one end of the filter member 13, hereinafter more fully described.

The free ends of the bolts 8 have shoulders 14 for supporting a plate 15 in spaced relation to the plate 7, the plate 15 being held on the ends of said bolts by nuts 16. The inner side of the plate 15 has an annular flange 17 corresponding to the flange 11 on plate 7 for supporting the opposite end of the filter unit 13.

The filter unit 13 which is in the form of a bellows is made up of a plurality of pairs of annular disks 18 and 18' of filter material, the disks of each pair being secured together adjacent their outer peripheries, as by lines of stitching 19. The contiguous disks of each adjacent pair are secured together adjacent their inner peripheries, as by lines of stitching 20. A ring 21 of spring wire and having overlapping ends is positioned between the disks of each pair, and, being resilient, tends to hold said disks in extended flat condition. The several pairs, when thus secured together and distended lengthwise thereof, define an elongated bellows, the opposite ends of which are secured to the plates 7 and 15. The ring 21' between the end pair of disks adjacent to the plate 15, engages within the annular flange 17 for holding the end of the bellows against said plate, the end disk 22 of the bellows adjacent to the plate 15 being preferably continuous, as shown. The end of the bellows adjacent to the plate 7 is held thereagainst by the ring 21'', in the end pair of disks, said ring urging the periphery of said outermost pair of disks into the space between the annular flange and the plate 7, as indicated. The disk 23 adjacent the plate 7 has an opening therethrough for the passage of air from the bellows into the base. The central openings in the several disks gradually become larger in size toward the end of disk 23, thereby accommodating increasingly greater amounts of air. By this arrangement the velocity of air through the several disk openings is maintained substantially uniform so that the pressure differential on opposite sides of the filter bellows is substantially uniform over the entire area of said bellows. Moreover, by varying the size of the openings it is possible to provide for a more uniform vibration of the bellows as a result of the pulsating intake of air, as hereinafter described. It will be apparent that in the positioning of the bellows in the supporting frame said bellows are distended longitudinally so that the outer peripheries of adjacent pairs of disks are spaced from each other to form a plurality of filtering surfaces tapering toward each other, between which surfaces the air being filtered enters. This arrangement of filtering surfaces converging toward each other in the direction of movement of the air is found to be most efficient for the filtering of large volumes of air without a material pressure differential on opposite sides of the filter material.

In operation the base 1 is connected to the intake of any compressor or combustion engine, or other device where it is desirable to filter the air, and air is drawn, as indicated by the arrows, through the several disks forming the bellows and through the opening in the base. Where there is a pulsating intake of air, as in the usual air compressor, the resilient mounting of the bellows provides for a vibrating action axially of said bellows in timed relation to the pulsating movement of the air, and this vibration discharges any accumulated dust and other foreign matter on the outer surface of the filter material, thereby keeping the filter bellows substantially clean without the necessity for manual cleaning thereof.

Figure 2:
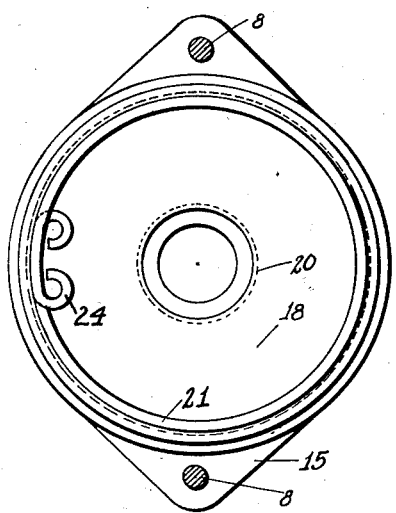
Fig. 2 is a sectional view along the line 2—2 of Fig. 1.
Figure 3:
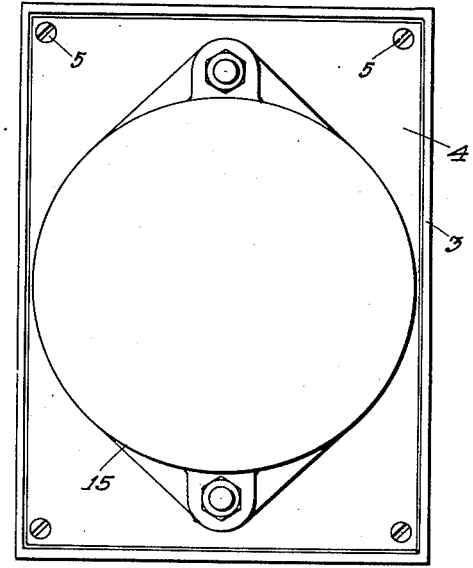
Fig. 3 is an end view of the unit.

When a filter bellows has become worn replacement is readily effected by removal of the worn bellows and substitution of a new bellows therefor. Since the rings 21' and 21" are resilient the worn bellows can be removed by a pull on the bellows away from the plates 15 and 7, thereby pulling said rings out from within the corresponding flanges. The new bellows is placed in position by springing the rings 21' and 21" therein inwardly until they are properly located within the flanges on the plates 7 and 15. Wear on the filter material as a result of the movements of the several rings, either in handling said rings or as a result of the vibration of the bellows when in operation, is eliminated by turning the ends of said rings inwardly, as indicated at 24, Fig. 2.

From the foregoing it will be apparent that the invention provides a filter which is self-cleaning and which provides for the filtering of a relatively large amount of air without producing an appreciable pressure differential on opposite sides of said filter bellows. The bellows, as has been pointed out, are readily replaceable without difficulty. Moreover, the units are constructed so that a multiplicity of units can all be mounted on a single base, the latter having a plurality of openings therein, so that this type of unit can be used in installations requiring the filtering of larger amounts of air than could be efficiently cleaned by a single unit.

I claim:

1. In a filter unit, a filter member comprising a plurality of pairs of annular disks of filter material, the disks of each pair being secured together at their outer edges, contiguous disks of adjacent pairs being secured together at their inner edges to form a filter bellows, means for supporting said bellows in longitudinally distending condition to provide for the filtering of air through said bellows and a resilient distending member in the form of a split ring for holding each pair of disks in open position.

2. In a filter unit, a filter member comprising a plurality of pairs of annular disks of filter material, the disks of each pair being sewn at their outer edges, contiguous disks of adjacent pairs being secured together at their inner edges to form a filter bellows, a supporting member for said bellows and resilient distending members for holding said bellows in open position, one of said distending members providing the sole securing means between the supporting member and the bellows.

3. In a filter unit, a filter member comprising a plurality of pairs of annular disks of filter material secured together to form a bellows, supporting means at each end of said bellows for supporting said bellows in distended filtering position longitudinally of said bellows, and resilient means in the form of rings for supporting said bellows in axially distended position, certain of said rings providing the sole connection between said bellows and the supporting means.

4. In a filter unit, a filter member comprising a plurality of pairs of annular disks of filter material secured together to form a bellows, supporting means at each end of said bellows for supporting said bellows in distended filtering position longitudinally of said bellows, and resilient means in the form of rings for supporting said bellows in axially distended position, certain of said rings providing the sole connection between said bellows and the supporting means, said supporting means having annular grooves on the inner side thereof with which the rings are engageable.

5. In a filter unit, a filter member comprising a plurality of pairs of annular disks of filter material, the disks of each pair being secured together at their outer edges, and continuous disks of adjacent pairs being secured together at their inner edges to form a filter bellows, the central openings in said disks increasing in diameter toward one end of said member.

6. In a filter unit, a filter member comprising a plurality of pairs of annular disks of filter material secured together to form a bellows, the central openings in said disks increasing in size toward one end of said bellows, supporting means at each end of said bellows for supporting said bellows in distended filtering position longitudinally of said bellows, and resilient means in the form of rings for supporting said bellows in axially distended position, certain of said rings providing the sole connection between said bellows and the supporting means, said supporting means having annular grooves on the inner side thereof with which the rings are engageable.

7. In a filter unit, a filter member comprising a plurality of pairs of annular disks of filter material, the disks of each pair being secured together at their outer edges, contiguous disks of adjacent pairs being secured together at their inner edge to form a filter bellows, means for supporting said bellows in longitudinally distended condition to provide for the filtering of air through said bellows, and a resilient distending member for holding each pair of disks in open position, each distending member comprising a split ring engageable between the disks of each pair adjacent to their outer edges.

RICHARD STRINDBERG.